(12) United States Patent
Shitara et al.

(10) Patent No.: US 9,045,670 B2
(45) Date of Patent: Jun. 2, 2015

(54) PRESSURE-SENSITIVE ADHESIVE SHEET (71) Applicant: NITTO DENKO CORPORATION, Osaka (JP)

(72) Inventors: Koji Shitara, Osaka (JP); Hiroko Ikenaga, Osaka (JP); Hiroaki Kishioka, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 300 days.

(21) Appl. No.: 13/628,897

(22) Filed: Sep. 27, 2012

(65) Prior Publication Data

US 2013/0085215 A1    Apr. 4, 2013

(30) Foreign Application Priority Data

Sep. 30, 2011  (JP) .................................. 2011-216301

(51) Int. Cl.
| | | |
|---|---|---|
| C08K 5/34 | (2006.01) | |
| C08K 5/00 | (2006.01) | |
| B32B 27/32 | (2006.01) | |
| C09J 7/02 | (2006.01) | |
| C08K 5/3492 | (2006.01) | |

(52) U.S. Cl.
CPC ............. C09J 7/0217 (2013.01); C08K 5/3492 (2013.01); C09J 2205/102 (2013.01); C09J 2201/622 (2013.01)

(58) Field of Classification Search
USPC ............................. 524/91, 100; 428/220, 355
See application file for complete search history.

(56) References Cited

U.S. PATENT DOCUMENTS

| | | | |
|---|---|---|---|
| 8,691,924 B2 | 4/2014 | Takarada et al. | |
| 8,883,926 B2 | 11/2014 | Okamoto et al. | |
| 8,945,710 B2 | 2/2015 | Kishioka et al. | |
| 2003/0232192 A1 | 12/2003 | Kishioka et al. | |
| 2004/0191509 A1 | 9/2004 | Kishioka et al. | |
| 2004/0202879 A1* | 10/2004 | Xia et al. | ....................... 428/500 |
| 2009/0087650 A1 | 4/2009 | Inoue et al. | |
| 2011/0112249 A1 | 5/2011 | Takarada et al. | |

(Continued)

FOREIGN PATENT DOCUMENTS

| | | |
|---|---|---|
| AL | WO2013011811 A1 | 2/2015 |
| CN | 1958704 A | 5/2007 |

(Continued)

OTHER PUBLICATIONS

Office Action dated Nov. 2, 2014, issued by the State Intellectual Property of P.R. China in counterpart Chinese Application No. 201210370869.6.

(Continued)

*Primary Examiner* — Susannah Chung
*Assistant Examiner* — Atnaf Admasu
(74) *Attorney, Agent, or Firm* — Sughrue Mion, PLLC (57) ABSTRACT

The present invention realizes a display device or input device having excellent ultraviolet protection property for the touch panel, display element or the like, while retaining optical characteristics, even when a small amount of or no optical film is used. The pressure-sensitive adhesive sheet of the present invention has a total light transmittance of 85% or more, a light transmittance at a wavelength of 380 nm of 5% or less, and a haze of 3% or less. The pressure-sensitive adhesive sheet preferably includes a pressure-sensitive adhesive layer containing an acrylic polymer and a triazine-based ultraviolet absorber.

5 Claims, 1 Drawing Sheet

(56) References Cited

U.S. PATENT DOCUMENTS

| | | |
|---|---|---|
| 2012/0094037 A1 | 4/2012 | Banba et al. |
| 2012/0328873 A1 | 12/2012 | Kishioka et al. |
| 2012/0329970 A1 | 12/2012 | Kishioka et al. |
| 2013/0005910 A1 | 1/2013 | Okamoto et al. |
| 2013/0323437 A1 | 12/2013 | Banba et al. |
| 2014/0168544 A1 | 6/2014 | Niimi |

FOREIGN PATENT DOCUMENTS

| | | |
|---|---|---|
| CN | 101395508 A | 3/2009 |
| JP | 2003-238915 A | 8/2003 |
| JP | 2003-342542 A | 12/2003 |
| JP | 2004-231723 A | 8/2004 |
| JP | 2007077387 A | 3/2007 |
| JP | 2009-128770 A | 6/2009 |
| JP | 2010265440 | 11/2010 |
| JP | 201199078 A | 5/2011 |
| JP | 2011-126986 A | 6/2011 |
| JP | 2011175053 | 9/2011 |
| WO | 2010147047 A1 | 12/2010 |
| WO | 2011/118183 A1 | 9/2011 |
| WO | 2011111576 A1 | 9/2011 |

OTHER PUBLICATIONS

Notification dated Oct. 30, 2014 issued by the Japanese Patent Office in counterpart Japanese Patent Application No. 2011-216301.

Office Action, Issued by the Japan Patent Office, Dated Feb. 27, 2015, in counterpart Japanese Application No. 2011-216301.

* cited by examiner

PRESSURE-SENSITIVE ADHESIVE SHEET

BACKGROUND OF THE INVENTION

1. Technical Field

The present invention relates to a pressure-sensitive adhesive sheet.

2. Background Art

Recently, in various fields, display devices such as a liquid crystal display (LCD) or an input device used by combining with the display device, such as a touch panel, has been widely used. In the display device or the input device, a pressure-sensitive adhesive tape or sheet including a pressure-sensitive adhesive layer is used for laminating an optical member. For example, a transparent pressure-sensitive adhesive sheet is used for laminating the touch panel and various kinds of display members optical members (for example, see Patent Documents 1 to 3).

The optical members used in such a display device or an input device may be sometimes required to have ultraviolet absorbency (ultraviolet protection property, UV protection property) for the purpose of, for example, preventing deterioration of a liquid crystal display due to ultraviolet light.

An optical film containing an ultraviolet absorber is known as such an optical member (see, for example, Patent Document 4).

Patent Document 1: JP 2003-238915 A
Patent Document 2: JP 2003-342542 A
Patent Document 3: JP 2004-231723 A
Patent Document 4: JP 2011-126986 A

SUMMARY OF THE INVENTION

In display devices or input devices, however, there are some cases where no or only a small amount of optical film is used. In these cases, a display device or an input device is demanded to have more excellent ultraviolet protection property for a touch panel, display element or the like therein, while retaining optical characteristics thereof.

Accordingly, an object of the present invention is to realize a display device or an input device including a touch panel, a display element or the like, in which the display device or input device has excellent ultraviolet protection property for the touch panel, display element or the like, while retaining optical characteristics, even when a small amount of or no optical film is used.

The inventors have made intensive studies and, as a result, have found that, when a pressure-sensitive adhesive sheet used on a touch panel, a display element or the like has a total light transmittance not less than a predetermined value, has a light transmittance at a wavelength of 380 nm not more than a predetermined value, and has a haze not more than a predetermined value, the display device or an input device having excellent ultraviolet protection property for the touch panel, display element or the like, while retaining optical characteristics, can be realized, even in the case of using a small amount of or no optical film. The present invention has been completed based on these findings.

The present invention provides a pressure-sensitive adhesive sheet, having: a total light transmittance of 85% or more; a light transmittance at a wavelength of 380 nm of 5% or less; and a haze of 3% or less.

The pressure-sensitive adhesive sheet preferably contains a pressure-sensitive adhesive layer containing an acrylic polymer and a triazine-based ultraviolet absorber.

In the pressure-sensitive adhesive sheet, the acrylic polymer preferably contains, as a monomer unit, at least one of an alkyl (meth)acrylate having a linear or branched alkyl group and an alkoxyalkyl (meth)acrylate.

In the pressure-sensitive adhesive sheet, a total of a proportion of the alkyl (meth)acrylate and a proportion of the alkoxyalkyl (meth)acrylate is preferably 30 wt % or more based on total monomer components (100 wt %) forming the acrylic polymer.

In the pressure-sensitive adhesive sheet, the acrylic polymer preferably contains, as a monomer unit, a monomer containing a nitrogen atom in a molecule thereof.

In the pressure-sensitive adhesive sheet, a proportion of the monomer containing a nitrogen atom in a molecule thereof is preferably 1 to 30 wt % based on total monomer components (100 wt %) forming the acrylic polymer.

In the pressure-sensitive adhesive sheet, the acrylic polymer preferably contains, as a monomer unit, a monomer containing a hydroxyl group in a molecule thereof.

In the pressure-sensitive adhesive sheet, a proportion of the monomer containing a hydroxyl group in a molecule thereof is preferably 0.5 to 25 wt % based on total monomer components (100 wt %) forming the acrylic polymer.

In the pressure-sensitive adhesive sheet, a content of the triazine-based ultraviolet absorber is preferably 1 to 10 parts by weight relative to 100 parts by weight of the acrylic polymer.

The pressure-sensitive adhesive sheet is preferably an optical pressure-sensitive adhesive sheet.

The pressure-sensitive adhesive sheet of the present invention has the above described constitution, and therefore lamination thereof onto a touch panel, a display element or the like makes it possible to realize a display device or an input device having excellent ultraviolet protection property (UV protection property) for the touch panel, display element or the like while retaining optical characteristics, even in the case of using a small amount of or no optical film.

DETAILED DESCRIPTION OF THE INVENTION

The pressure-sensitive adhesive sheet of the present invention includes at least a pressure-sensitive adhesive layer. The pressure-sensitive adhesive sheet of the present invention has a total light transmittance of 85% or more, a light transmittance at a wavelength of 380 nm of 5% or less, and a haze of 3% or less.

In the present specification, the "pressure-sensitive adhesive sheet" is meant to include a "pressure-sensitive adhesive tape". In addition, the surface of a pressure-sensitive adhesive layer in the pressure-sensitive adhesive sheet may be called "pressure-sensitive adhesive surface".

The pressure-sensitive adhesive sheet of the present invention may be a double-sided pressure-sensitive adhesive sheet in which the pressure-sensitive adhesive surfaces are included in both surfaces of the pressure-sensitive adhesive sheet, or a single-sided pressure-sensitive adhesive sheet in which the pressure-sensitive adhesive surface is included in only one surface of the pressure-sensitive adhesive sheet. Among them, the pressure-sensitive adhesive sheet of the present invention is preferably the double-sided pressure-sensitive adhesive sheet from the standpoint of laminating two members each other.

The pressure-sensitive adhesive sheet of the present invention may be a "substrateless type" pressure-sensitive adhesive sheet that does not have a substrate (substrate layer), or may be a pressure-sensitive adhesive sheet with a substrate. In the present specification, the "substrateless type" pressure-sensitive adhesive sheet may be called "substrateless pressure-sensitive adhesive sheet", and the pressure-sensitive adhesive sheet with a substrate may be called "pressure-sensitive adhesive sheet with substrate".

Among them, the pressure-sensitive adhesive sheet of the present invention is preferably a substrateless pressure-sensitive adhesive sheet, and more preferably a double-sided pressure-sensitive adhesive sheet consisting of a pressure-sensitive adhesive layer (especially the pressure-sensitive adhesive layer of the present invention described later) so that the pressure-sensitive adhesive sheet of the present invention does not limit the kind of adherend, member or the like and may be used for with the lamination of a variety of adherends, members or the like The pressure-sensitive adhesive sheet of the present invention has a total light transmittance of 85% or more, preferably 90% or more. The total light transmittance, as used herein, means a total light transmittance in the visible range, which is a wavelength range of 400 nm to 780 nm. The total light transmittance can be measured, for example, by using a haze meter according to JIS K 7361-1.

The pressure-sensitive adhesive sheet of the present invention has a haze of 3% or less, more preferably 1.5% or less. The haze can be measured, for example, by using a haze meter according to JIS K 7136.

The light transmittance at a wavelength of 380 nm of the pressure-sensitive adhesive sheet of the present invention is 5% or less, preferably 1% or less, and more preferably 0.5% or less. The light transmittance at a wavelength of 330 nm of the pressure-sensitive adhesive sheet of the present invention is not particularly limited, but is preferably 5% or less, more preferably 1% or less, and still more preferably 0.5% or less. These light transmittances can be measured, for example, by using a haze meter according to JIS K 7361-1.

In particular, in the pressure-sensitive adhesive sheet of the present invention, the light transmittance in a whole wavelength range of 330 nm to 380 nm is preferably 5% or less, more preferably 1% or less, and still more preferably 0.5% or less. The light transmittance in the whole wavelength range of 330 to 380 nm can be measured, for example, by using a haze meter according to JIS K 7361-1.

The b* value of the pressure-sensitive adhesive sheet of the present invention is not particularly limited, but is preferably from 0 to 2.0, more preferably from 0 to 1.5. The pressure-sensitive adhesive sheet of the present invention having the b* value of 2.0 or less is less likely to adversely affect the appearance of a product (especially, an optical product described later) in which the pressure-sensitive adhesive sheet of the present invention is used, and therefore is preferred. The b* value is a b* value in the L*a*b* color system, which is according to JIS Z 8729, and can be measured by a simplified spectrophotometric colorimeter (trade name "DOT-3C", manufactured by Murakami Color Research Laboratory Co., Ltd.).

(1) Pressure-Sensitive Adhesive Layer

The pressure-sensitive adhesive sheet of the present invention includes at least a pressure-sensitive adhesive layer. In particular, the pressure-sensitive adhesive sheet of the present invention preferably has at least a pressure-sensitive adhesive layer that has a total light transmittance of 85% or more, a light transmittance at a wavelength of 380 nm of 5% or less, and a haze of 3% or less. Incidentally, "a pressure-sensitive adhesive layer that has a total light transmittance of 85% or more, a light transmittance at a wavelength of 380 nm of 5% or less, and a haze of 3% or less" is herein sometimes referred to as "the pressure-sensitive adhesive layer of the present invention". Also, a pressure-sensitive adhesive layer of the present invention that is an acrylic pressure-sensitive adhesive layer is sometimes referred to as "the acrylic pressure-sensitive adhesive layer of the present invention".

The pressure-sensitive adhesive layer of the present invention has a total light transmittance of 85% or more, preferably 90% or more. The total light transmittance can be measured, for example, by using a haze meter according to JIS K 7361-1.

The pressure-sensitive adhesive layer of the present invention has a haze of 3% or less, more preferably 1.5% or less. The haze can be measured, for example, by using a haze meter according to JIS K 7136.

The light transmittance at a wavelength of 380 nm of the pressure-sensitive adhesive layer of the present invention is 5% or less, preferably 1% or less, and more preferably 0.5% or less. The light transmittance at a wavelength of 330 nm of the pressure-sensitive adhesive layer of the present invention is not particularly limited, but is preferably 5% or less, more preferably 1% or less, and still more preferably 0.5% or less. These light transmittances can be measured, for example, by using a haze meter according to JIS K 7361-1.

In particular, in the pressure-sensitive adhesive layer of the present invention, the light transmittance in a whole wavelength range of 330 nm to 380 nm is preferably 5% or less, more preferably of 1% or less, and still more preferably of 0.5% or less. The light transmittance in the whole wavelength range of 330 to 380 nm can be measured, for example, by using a haze meter according to JIS K 7361-1.

The b* value of the pressure-sensitive adhesive layer of the present invention is not particularly limited, but is preferably from 0 to 2.0, more preferably from 0 to 1.5. The pressure-sensitive adhesive layer of the present invention having the b* value of 2.0 or less is less likely to adversely affect the appearance of a product (especially, an optical product described later) in which the pressure-sensitive adhesive layer of the present invention is used, and therefore is preferred. The b* value is a b* value in the L*a*b* color system, which is according to JIS Z 8729, and can be measured by a simplified spectrophotometric colorimeter (trade name "DOT-3C", manufactured by Murakami Color Research Laboratory Co., Ltd.).

The pressure-sensitive adhesive included in the pressure-sensitive adhesive layer (in particular, the pressure-sensitive adhesive layer of the present invention) included in the pressure-sensitive adhesive sheet of the present invention is not particularly limited, and examples thereof include acrylic pressure-sensitive adhesive, rubber-based pressure-sensitive adhesive, vinyl alkyl ether-based pressure-sensitive adhesive, silicone-based pressure-sensitive adhesive, polyester-based pressure-sensitive adhesive, polyamide-based pressure-sensitive adhesive, urethane-based pressure-sensitive adhesive, fluorine-based pressure-sensitive adhesive, epoxy-based pressure-sensitive adhesive, etc. Among them, as the pressure-sensitive adhesive which constitutes the pressure-sensitive adhesive layer, the acrylic pressure-sensitive adhesive is preferable from the standpoint of weather resistance, cost and easiness of design of pressure-sensitive adhesive. That is, the pressure-sensitive adhesive sheet of the present invention preferably includes the acrylic pressure-sensitive adhesive (in particular, the acrylic pressure-sensitive adhesive of the present invention) including an acrylic polymer as a main component. These pressure-sensitive adhesive may be used either alone or in combination of two or more kinds thereof.

The pressure-sensitive adhesive included in the pressure-sensitive adhesive layer of the present invention may be a pressure-sensitive adhesive having any form. Examples of the pressure-sensitive adhesive included in the pressure-sensitive adhesive layer of the present invention include an emulsion type pressure-sensitive adhesive, a solvent type (solution type) pressure-sensitive adhesive, an active energy ray-curable pressure-sensitive adhesive, a hot melt type pressure-sensitive adhesive and the like. Of these, a solvent type pressure-sensitive adhesive and an active energy ray-curable pressure-sensitive adhesive are preferable from the standpoints of productivity and compatibility with the ultraviolet absorber.

The content of the acrylic polymer in the acrylic pressure-sensitive adhesive is not particularly limited, and is preferably 70 wt % or more (for example, 70 to 100 wt %), and more preferably 85 wt % or more (for example, 85 to 100 wt %) based on the whole amount of the pressure-sensitive adhesive (100 wt %).

(Acrylic Polymer)

The acrylic pressure-sensitive adhesive layer is preferably formed from an acrylic pressure-sensitive adhesive composition. The acrylic pressure-sensitive adhesive composition is not particularly limited, and examples thereof include an acrylic pressure-sensitive adhesive composition that includes the acrylic polymer as an essential component, and an acrylic pressure-sensitive adhesive composition that includes, as an essential component, a mixture of monomers forming the acrylic polymer (referred to as a "monomer mixture" in some cases) or partially polymerized product thereof. As the former acrylic pressure-sensitive adhesive, examples thereof include a so-called solvent type pressure-sensitive adhesive composition, and as the latter acrylic pressure-sensitive adhesive, examples thereof include a so-called active energy-ray curable pressure-sensitive adhesive composition. The acrylic pressure-sensitive adhesive composition may include an additive, if needed.

The term "pressure-sensitive adhesive composition" as used herein includes a "composition for forming the pressure-sensitive adhesive". The term "monomer mixture" as used herein means a mixture consisting of only monomer components forming the polymer. The term "partially polymerized product" as used herein means a composition where one component or two or more components out of constituent components of the monomer mixture are partially polymerized.

The acrylic polymer is a polymer formed from a component including an acrylic monomer as an essential monomer component. As the monomer component of the acrylic polymer, a copolymerizable monomer may be included.

The acrylic polymer is preferably formed from (composed of) a monomer component including, as the essential monomer component, an alkyl (meth)acrylate having a linear or branched alkyl group and/or alkoxyalkyl (meth)acrylate. That is, the acrylic polymer preferably includes, as the monomer constituent unit, an alkyl (meth)acrylate having a linear or branched alkyl group and/or alkoxyalkyl (meth)acrylate. In this specification, the "alkyl (meth)acrylate having a linear or branched alkyl group" may be simply referred to as a "alkyl (meth)acrylate"; and the "(meth)acryl" means "acryl" and/or "methacryl" (one or both of "acryl" and "methacryl"), and the same shall apply hereinunder. The acrylic polymer is formed from one or two or more kinds of the monomer component(s).

As the alkyl (meth)acrylate (alkyl (meth)acrylate having a linear or branched alkyl group), examples thereof include an alkyl (meth)acrlyate having a liner or branched alkyl group having 1 to 20 carbon atoms, such as methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate), pentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, and eicosyl (meth)acrylate. Among them, alkyl (meth)acrylate having a linear or branched alkyl group having 1 to 12 carbon atoms is preferable; and 2-ethylhexyl acrylate (2EHA), n-butyl acrylate (BA) and methyl methacrylate (MMA) are more preferable. The alkyl (meth)acrylate may be used either alone or in combination of two or more thereof.

The alkoxyalkyl (meth)acrylate is not particularly limited, and examples thereof include 2-methoxyethyl (meth)acrylate, 2-ethoxyethyl (meth)acrylate, methoxytriethylene glycol (meth)acrylate, 3-methoxypropyl (meth)acrylate, 3-ethoxypropyl (meth)acrylate, 4-methoxybutyl (meth)acrylate, and 4-ethoxybutyl (meth)acrylate. Among them, as the alkokyalkyl (meth)acrylate, the alkoxyalkyl acrylate is prefarable, and 2-methoxyethyl acrylate (MEA) is more preferable. The alkoxylalkyl (meth)acrylate may be used either alone or in combination of two or more thereof.

The total of the proportion of the alkyl (meth)acrylate and the proportion of the alkoxyalkyl (meth)acrylate[(proportion of alkyl (meth)acrylate)+(proportion of alkoxyalkyl (meth)acrylate)] based on the total monomer components (100 wt %) forming the acrylic polymer is not particularly limited, but is preferably 30 wt % or more (for example, from 30 to 99 wt %), more preferably 50 wt % or more (for example, from 50 to 99 wt %).

The ratio of the alkyl (meth)acrylate and the alkoxyalkyl (meth)acrylate is not particularly limited, but is preferably from 100:0 to 25:75, more preferably from 100:0 to 50:50, in terms of the weight ratio of [the former:the later].

The acrylic polymer may include a copolymerizable monomer as the monomer component. As the monomer constituent unit of the acrylic polymer, a copolymerizable monomer may be included.

Examples of the copolymerizable monomer preferably include, but not limited to, a monomer containing a nitrogen atom in a molecule thereof, and a monomer containing a hydroxyl group in a molecule thereof in terms of providing a pressure-sensitive adhesive layer that exhibits suppressed cloudiness and enhanced durability under high-humidity conditions, as well as good compatibility with an ultraviolet absorber. That is, the acrylic polymer preferably contains a monomer containing a nitrogen atom in a molecule thereof as a monomer unit. Also, the acrylic polymer preferably contains a monomer containing a hydroxyl group in a molecule thereof as a monomer unit.

The monomer containing a nitrogen atom in a molecule thereof has one or more nitrogen atoms in its molecule (in one molecule thereof). In this specification, the "monomer containing a nitrogen atom in a molecule thereof" is called a "nitrogen atom-containing monomer" in some cases. The nitrogen atom-containing monomer may be used either alone or in combination of two or more thereof.

More particularly, examples of the nitrogen atom-containing monomer include N-vinyl cyclic amide, (meth)acryl amides and the like.

As the N-vinyl cyclic amide, examples thereof include an N-vinyl cyclic amide represented by the following formula (1).

$$CH_2 = CHNCOR^1 \quad (1)$$

(In the formula (1), $R^1$ represents a divalent organic group)

In the formula (1), $R^1$ is a divalent organic group, preferably a divalent saturated hydrocarbon group or a divalent unsaturated hydrocarbon group, and more preferably a divalent saturated hydrocarbon group (for example, an alkylene group having 3 to 5 carbon atoms and the like).

Examples of the N-vinyl cyclic amide represented by the formula (1) include N-vinyl-2-pyrrolidone, N-vinyl-2-piperidone, N-vinyl-3-morpholinone, N-vinyl-2-caprolactam, N-vinyl-1,3-oxazine-2-one, N-vinyl-3,5-morpholine dione, and the like.

Examples of the (meth)acrylamides include (meth)acrylamide, N-alkyl (meth)acrylamide, N,N-dialkyl (meth)acrylamide and the like. Examples of the N-alkyl (meth)acrylamide include N-ethyl (meth)acrylamide, N-isopropyl (meth)acrylamide, N-n-butyl (meth)acrylamide, N-octyl acrylamide and the like. Examples of the N-alkyl (meth)acrylamide include (meth)acrylamide having an amino group, such as dimethylaminoethyl (meth)acrylamide, diethylaminoethyl (meth)acrylamide and dimethylaminopropyl (meth)acrylamide. Examples of the N,N-dialkyl (meth)acrylamide include N,N-dimethyl (meth)acrylamide, N,N-diethyl (meth)acrylamide, N,N-dipropyl (meth)acrylamide, N,N-diisopropyl (meth)acrylamide, N,N-di(n-butyl) (meth)acrylamide, N,N-di(t-butyl) (meth)acrylamide and the like.

The (meth)acrylamides also includes various N-hydroxyalkyl (meth)acrylamides. Examples of the N-hydroxyalkyl (meth)acrylamides include N-methylol (meth)acrylamide, N-(2-hydroxyethyl) (meth)acrylamide, N-(2-hydroxypropyl) (meth)acrylamide, N-(1-hydroxypropyl) (meth)acrylamide, N-(3-hydroxypropyl) (meth)acrylamide, N-(2-hydroxybutyl) (meth)acrylamide, N-(3-hydroxybutyl) (meth)acrylamide, N-(4-hydroxybutyl) (meth)acrylamide, N-methyl-N-2-hydroxyethyl(meth)acrylamide and the like.

The (meth)acrylamides also includes various N-alkoxyalkyl(meth)acrylamides. Examples of the N-alkoxyalkyl (meth)acrylamide include N-methoxymethyl (meth)acrylamide, N-butoxymethyl (meth)acrylamide and the like.

Examples of the nitrogen atom-containing monomer other than the N-vinyl cyclic amide and the (meth)acrylamides include an amino group-containing monomer such as aminoethyl (meth)acrylate, dimethylaminoethyl (meth)acrylate, dimethylaminopropyl (meth)acrylate and t-butylaminoethyl (meth)acrylate; a cyano group-containing monomer such as acrylonitrile and methacrylonitrile; a heterocyclic ring-containing monomer such as (meth)acryloyl morpholine, N-vinylpiperazine, N-vinylpyrrole, N-vinylimidazole, N-vinylpyrazine, N-vinylmorpholine, N-vinylpyrazole, vinylpyridine, vinylpyrimidine, vinyloxazole, vinylisoxazole, vinylthiazole, vinylisothiazole, vinylpyridazine, (meth)acryloyl pyrrolidone, (meth)acryloyl pyrrolidine, (meth)acryloyl piperidine and N-methylvinylpyrrolidone; an imide group-containing monomer including a maleimide-based monomer such as N-cyclohexylmaleimide, N-isopropylmaleimide, N-laurylmaleimide and N-phenylmaleimide, an itaconimide-based monomer such as N-methylitaconimide, N-ethylitaconimide, N-butylitaconimide, N-octylitaconimide, N-2-ethylhexylitaconimide, N-laurylitaconimide and N-cyclohexylitaconimide, a succinimide-based monomer such as N-(meth)acryloyloxymethylene succinimide, N-(meth)acryloyl-6-oxyhexamethylene succinimide and N-(meth)acryloyl-8-oxyoctamethylene succinimide; an isocyanate group-containing monomer such as 2-(meth)acryloyloxyethyl isocyanate; and the like.

Among them, as the nitrogen atom-containing monomer, N-vinyl cyclic amide represented by the formula (1) and (meth)acrylamides are preferable, N-vinyl-2-pyrrolidone (NVP), N-vinyl-2-caprolactam, N,N-dimethyl (meth)acrylamide and N,N-diethyl (meth)acrylamide are more preferable, and N-vinyl-2-pyrrolidone is even more preferable.

The proportion of the nitrogen atom-containing monomer based on the total monomer components (100 wt %) forming the acrylic polymer is not particularly limited, but is preferably from 1 to 30 wt %, more preferably from 3 to 25 wt %, and still more preferably from 3 to 20 wt %, in terms of providing an acrylic pressure-sensitive adhesive layer of high transparency by controlling the total light transmittance and the haze of the acrylic pressure-sensitive adhesive layer, and providing a pressure-sensitive adhesive layer having good compatibility with an ultraviolet absorber.

The monomer containing a hydroxyl group in a molecule thereof has one or more hydroxyl groups in its molecule (in one molecule thereof). However, in the monomer containing a hydroxyl group in a molecule thereof, the nitrogen atom-containing monomer is not included. That is, in this specification, the monomer containing both a nitrogen atom and a hydroxyl group in a molecule thereof is included in the "nitrogen atom-containing monomer". In this specification, the "monomer containing a hydroxyl group in a molecule thereof" is called a "hydroxyl group-containing monomer" in some cases. The hydroxyl group-containing monomer may be used either alone or in combination or two or more thereof.

Examples of the hydroxyl group-containing monomer include hydroxyl group-containing (meth)acrylic acid ester, such as 2-hydroxyethyl(meth)acrylate, 3-hydroxypropyl (meth)acrylate, 4-hydroxybutyl (meth)acrylate, 6-hydroxyhexyl (meth)acrylate, hydroxyoctyl (meth)acrylate, hydroxydecyl (meth)acrylate, hydroxylauryl (meth)acrylate and (4-hydroxymethylcyclohexyl) (meth)acrylate; vinyl alcohol, allyl alcohol and the like.

Among them, as the hydroxyl group-containing monomer, hydroxyl group-containing (meth)acrylic acid ester is preferable, and 2-hydroxyethyl acrylate (HEA) and 4-hydroxybutyl acrylate (4HBA) are more preferable.

The proportion of the hydroxyl group-containing monomer based on the total monomer components (100 wt %) forming the acrylic polymer is not particularly limited, but is preferably from 0.5 to 25 wt %, more preferably from 1 to 20 wt %, and still more preferably from 5 to 20 wt %, in terms of providing an acrylic pressure-sensitive adhesive layer of high transparency by controlling the total light transmittance and the haze of the acrylic pressure-sensitive adhesive layer, and generating an appropriate cohesive force, thereby suppressing cohesive failure.

As the copolymerizable monomer other than the nitrogen atom-containing monomer and hydroxyl group-containing monomer, a polyfunctional monomer may also be used. As the polyfunctional monomer, examples thereof include hexanediol di(meth)acrylate, butanediol di(meth)acrylate, (poly) ethylene glycol di(meth)acrylate, (poly)propylene glycol di(meth)acrylate, neopentyl glycol di(meth)acrylate, pentaerythritol di(meth)acrylate, pentaerythritol tri(meth)acrylate, dipentaerythritol hexa(meth)acrylate, trimethylolpropane tri(meth)acrylate, tetramethylolmethane tri(meth) acrylate, allyl (meth)acrylate, vinyl (meth)acrylate, divinylbenzene, epoxyacrylate, polyester acrylate and urethane acrylate. The polyfunctional monomer may be used either alone or in combination of two or more thereof.

The content of the polyfunctional monomer is not particularly limited, but is preferably 0.5 wt % or less (for example, 0 wt % to 0.5 wt %) and more preferably 0 wt % to 0.1 wt % based on the total monomer components (100 wt %) forming the acrylic polymer.

In addition, examples of the copolymerizable monomer include: an epoxy group-containing monomer (for example, glycidyl (meth)acrylate, methylglycidyl (meth)acrylate and the like); a sulfonate group-containing monomer (for example, sodium vinyl sulfonate and the like); a phosphate group-containing monomer; (meth)acrylic acid ester having an alicyclic hydrocarbon group (for example, cyclopentyl (meth)acrylate, cyclohexyl (meth)acrylate, isobornyl (meth) acrylate and the like); (meth)acrylic acid ester having an aromatic hydrocarbon group (for example, phenyl (meth) acrylate, phenoxyethyl (meth)acrylate, benzyl (meth)acrylate and the like); vinyl esters (for example, vinyl acetate, vinyl propionate and the like); an aromatic vinyl compound (for example, styrene, vinyl toluene and the like); olefins or dienes (for example, ethylene, propylene, butadiene, isoprene, isobutylene and the like); vinyl ethers (for example, vinyl alkyl ether and the like); vinyl chloride, and the like.

The acrylic polymer can be prepared by polymerizing the monomer components. The polymerization method of the acrylic polymer is not particularly limited, and examples thereof include a solution polymerization method, an emulsion polymerization method, a bulk polymerization method and a polymerization method by an active energy-ray irradiation (active energy-ray polymerization method). Among them, from the standpoint of transparency and cost of the pressure-sensitive adhesive layer, the solution polymerization method and the active energy-ray polymerization method are preferable, and the solution polymerization method is more preferable.

In the polymerization of the acrylic polymer, various kinds of general solvents can be used. Examples of such a solvent include organic solvents such as: esters such as ethyl acetate and n-butyl acetate; aromatic hydrocarbons such as toluene and benzene; aliphatic hydrocarbons such as n-hexane and n-heptane; alicyclic hydrocarbons such as cyclohexane and methylcyclohexane; and ketones such as methylethylketone and methylisobutylketone. The solvents may be used either alone or in combination of two or more thereof.

In the polymerization of the acrylic polymer, a polymerization initiator such as a thermal polymerization initiator or a photopolymerization initiator (photoinitiator) may be used depending on a kind of polymerization reaction. The polymerization initiator may be used either alone or in combination of two or more thereof.

Examples of the thermal polymerization initiator include an azo-based initiator, a peroxide-based polymerization initiator (for example, dibenzoyl peroxide, tert-butylpermaleate and the like), a redox-based polymerization initiator and the like. Among the initiators, an azo-based initiator as disclosed in JP 2002-69411 A is particularly preferable. As the azo-based initiator, examples thereof include 2,2'-azobisisobutyronitrile (AIBN), 2,2'-azobis-2-methylbutyronitrile (AMBN), dimethyl 2,2'-azobis(2-methylpropionate), 4,4'-azobis-4-cyanovaleric acid and the like.

The used amount of the azo-based initiator is not particularly limited, and is preferably 0.05 parts by weight to 0.5 parts by weight, and more preferably 0.1 parts by weight to 0.3 parts by weight, based on 100 parts by weight of the total amount of the monomer components forming the acrylic polymer.

The weight average molecular weight (Mw) of the acrylic polymer is not particularly limited, and is generally 100,000 to 3,000,000, preferably 300,000 to 1,500,000, and more preferably 500,000 to 1,100,000 from the standpoint of the coating property of the acrylic pressure-sensitive adhesive composition including acrylic polymer.

(Ultraviolet Absorber)

The pressure-sensitive adhesive layer (especially, the acrylic pressure-sensitive adhesive layer of the present invention) preferably contains an ultraviolet absorber (UVA) in terms of providing high ultraviolet absorbency by controlling the light transmittance at a wavelength of 380 nm. Examples of the ultraviolet absorber preferably include, but not limited to, a benzotriazole-based ultraviolet absorber, a benzophenone-based ultraviolet absorber and a triazine-based ultraviolet absorber. The ultraviolet absorbers may be used alone or in combination of two or more kinds thereof.

Among them, the ultraviolet absorber is preferably a triazine-based ultraviolet absorber, more preferably a hydroxyl group-containing triazine ultraviolet absorber, and still more preferably a hydroxyphenyl triazine ultraviolet absorber, in terms of the ultraviolet absorbency, as well as in terms of exhibiting high compatibility with an acrylic polymer and of easily providing a acrylic pressure-sensitive adhesive layer having high transparency by controlling the total light transmittance and the haze of the acrylic pressure-sensitive adhesive layer. That is, the pressure-sensitive adhesive sheet of the present invention preferably includes a pressure-sensitive adhesive layer that contains the above-mentioned acrylic polymer and the triazine-based ultraviolet absorber (especially, hydroxyphenyl triazine ultraviolet absorber).

Examples of the triazine-based ultraviolet absorber include, but not limited to, 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-(2-hydroxy-4-propoxyphenyl)-1,3,5-triazine, 2,4-diphenyl-(2-hydroxy-4-butoxyphenyl)-1,3,5-triazine, 2,4-diphenyl-6-(2-hydroxy-4-butoxyphenyl)-1,3,5-triazine, 2,4-diphenyl-6-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, 2,4-diphenyl-6-(2-hydroxy-4-benzyloxyphenyl)-1,3,5-triazine, 2,4-diphenyl-6-(2-hydroxy-4-butoxyethoxy)-1,3,5-triazine, 2,4-bis(2-hydroxy-4-butoxyphenyl)-6-(2,4-dibutoxyphenyl)-1,3,5-triazine, 2,4,6-tris(2-hydroxy-4-methoxyphenyl)-1,3,5-triazine, 2,4,6-tris(2-hydroxy-4-etoxyphenyl)-1,3,5-triazine, 2,4,6-tris(2-hydroxy-4-propoxyphenyl)-1,3,5-triazine, 2,4,6-tris(2-hydroxy-4-butoxyphenyl)-1,3,5-triazine, 2,4,6-tris(2-hydroxy-4-butoxyphenyl)-1,3,5-triazine, 2,4,6-tris(2-hydroxy-4-hexyloxyphenyl)-1,3,5-triazine, 2,4,6-tris(2-hydroxy-4-octyloxyphenyl)-1,3,5-triazine, 2,4,6-tris(2-hydroxy-4-dodecyloxyphenyl)-1,3,5-triazine, 2,4,6-tris(2-hydroxy-4-benzyloxyphenyl)-1,3,5-triazine, 2,4,6-tris(2-hydroxy-4-ethoxyethoxyphenyl)-1,3,5-triazine, 2,4,6-tris(2-hydroxy-4-butoxyethoxyphenyl)-1,3,5-triazine, 2,4,6-tris(2-hydroxy-4-propoxyethoxyphenyl)-1,3,5-triazine, 2,4,6-tris(2-hydroxy-4-methoxycarbonylpropyloxyphenyl)-1,3,5-triazine, 2,4,6-tris(2-hydroxy-4-ethoxycarbonylethyloxyphenyl)-1,3,5-triazine, 2,4,6-tris(2-hydroxy-4-(1-(2-ethoxyhexyloxy)-1-oxopropan-2-yloxy) phenyl)-1,3,5-triazine, 2,4,6-tris(2-hydroxy-3-methyl-4-methoxyphenyl)-1,3,5-triazine, 2,4,6-tris(2-hydroxy-3-methyl-4-ethoxyphenyl)-1,3,5-triazine, 2,4,6-tris(2- hydroxy-3-methyl-4-propoxyphenyl)-1,3,5-triazine, 2,4,6-tris(2-hydroxy-3-methyl-4-butoxyphenyl)-1,3,5-triazine, 2,4,6-tris(2-hydroxy-3-methyl-4-butoxyphenyl)-1,3,5-triazine, 2,4,6-tris(2-hydroxy-3-methyl-4-hexyloxyphenyl)-1,3,5-triazine, 2,4,6-tris(2-hydroxy-3-methyl-4-octyloxyphenyl)-1,3,5-triazine, 2,4,6-tris(2-hydroxy-3-methyl-4-dodecyloxyphenyl)-1,3,5-triazine, 2,4,6-tris(2-hydroxy-3-methyl-4-benzyloxyphenyl)-1,3,5-triazine, 2,4,6-tris(2-hydroxy-3-methyl-4-ethoxyethoxyphenyl)-1,3,5-triazine, 2,4,6-tris(2-hydroxy-3-methyl-4-butoxyethoxyphenyl)-1,3,5-triazine, 2,4,6-tris(2-hydroxy-3-methyl-4-propoxyethoxyphenyl)-1,3,5-triazine, 2,4,6-tris(2-hydroxy-3-methyl-4-methoxycarbonylpropyloxyphenyl)-1,3,5-triazine, 2,4,6-tris(2-hydroxy-3-methyl-4-ethoxycarbonylethyloxyphenyl)-1,3,5-triazine, 2,4,6-tris(2-hydroxy-3-methyl-4-(1-(2-ethoxyhexyloxy)-1-oxopropan-2-yloxy)phenyl)-1,3,5-triazine.

Furthermore, a commercially available product can be used as the triazine-based ultraviolet absorber. Examples thereof include "TINUVIN 400" (manufactured by BASF, a reaction product of 2-(4,6-bis(2,4-dimethylphenyl)-1,3,5-triazin-2-yl)-5-hydroxyphenyl and [(C10- to C16-, mainly C12- to C13-alkyloxy)methyl]oxirane), "TINUVIN 405" (manufactured by BASF, a reaction product of 2-(2,4-dihydroxyphenyl)-4,6-bis-(2,4-dimethylphenyl)-1,3,5-triazine and (2-ethylhexyl)-glycidic acid ester), "TINUVIN 460" (manufactured by BASF, 2,4-bis[2-hydroxy-4-butoxyphenyl]-6-(2,4-dibutoxyphenyl)-1,3,5-triazine), "TINUVIN 1577" (manufactured by BASF, 2-(4,6-diphenyl-1,3,5-triazin-2-yl)-5-[(hexyl)oxy]-phenol), "TINUVIN 479" (manufactured by BASF, 2-(2-hydroxy-4-[1-octyloxycarbonylethoxy]phenyl)-4,6-bis(4-phenylphenyl)-1,3,5-triazine), "TINUVIN 477" (manufactured by BASF, a ultraviolet absorber having a 2,4-bis(2,4-dimethylphenyl)-6-[2-hydroxy-4-(3-alkyloxy-2-hydroxypropyloxy]-5-α-cumylphenyl)-2-tiazine backbone (alkyloxy: longer-chain alkyloxy group such as octyloxy, nonyloxy and decyloxy)).

The content of the triazine-based ultraviolet absorber in the acrylic pressure-sensitive adhesive layer (especially, the acrylic pressure-sensitive adhesive layer of the present invention) (or in an acrylic pressure-sensitive adhesive composition) is preferably from 1 to 10 parts by weight, more preferably from 3 to 10 parts by weight, still more preferably from 3 to 8 parts by weight, based on 100 parts by weight of the acrylic polymer. The content of 1 part by weight or more is preferred since the light transmittance at a wavelength of 380 nm can then be lowered, thereby easily providing excellent ultraviolet absorbency in the pressure-sensitive adhesive layer. The content of 10 parts by weight or less is also preferred since the total light transmittance and haze of the acrylic pressure-sensitive adhesive layer can then be controlled, thereby easily providing an acrylic pressure-sensitive adhesive layer of high transparency. A large amount of an ultraviolet absorber blended in a pressure-sensitive adhesive layer may lead to poor compatibility, resulting in precipitation of the ultraviolet absorber, to thereby cause lowering the transparency or deteriorating the pressure-sensitive adhesive properties such as adhesive force.

(Light Stabilizer)

The pressure-sensitive adhesive layer (especially, the acrylic pressure-sensitive adhesive layer of the present invention) preferably contains a light stabilizer, and particularly preferably contains a light stabilizer together with the ultraviolet absorber described above. The light stabilizer can capture radicals generated in photooxidation to thereby enhance resistance of the pressure-sensitive adhesive layer against light (especially, ultraviolet light). The light stabilizer may be used alone or in combination of two or more kinds thereof.

The light stabilizer is preferably, but not limited to, a hindered amine-based light stabilizer (HALS). Examples of the hindered amine-based light stabilizer include a polymerized product of dimethyl succinate and 4-hydroxy-2,2,6,6-tetramethyl-1-piperidine ethanol (trade name "TINUVIN 622", manufactured by BASF), a reaction product of a polymerized product of dimethyl succinate and 4-hydroxy-2,2,6,6-tetramethyl-1-piperidine ethanol with N,N',N'',N'''-tetrakis-(4,6-bis-(buthyl-(N-methyl-2,2,6,6-tetramethylpiperidine-4-yl)amino)-triazin-2-yl)-4,7-diazadecane-1,10-diamine (weight ratio thereof is 1:1) (trade name "TINUVIN 119", manufactured by BASF), a polycondensation product of dibuthylamine.1,3-triazine.N,N'-bis(2,2,6,6-tetramethyl-4-piperidyl-1,6-hexamethylenediamine and N-(2,2,6,6-tetramethyl-4-piperidyl)butylamine ((trade name "TINUVIN 2020", manufactured by BASF), poly[{6-(1,1,3,3-tetramethylbutyl)amino-1,3,5-triazin-2,4-diyl}{2,2,6,6-tetramethyl-4-piperidyl}imino]hexamethylene{(2,6,6-tetramethyl-4-piperidyl)imino}) ((trade name "TINUVIN 944", manufactured by BASF), a mixture of bis(1,2,2,6,6-pentamethyl-4-piperidyl)sebacate and methyl-1,2,2,6,6-pentamethyl-4-piperidyl sebacate (trade name "TINUVIN 765", manufactured by BASF), bis(2,2,6,6-tetramethyl-4-piperidyl)sebacate (trade name "TINUVIN 770", manufactured by BASF), a reaction product of decanedioic acid bis(2,2,6,6-tetramethyl-1-(octyloxy)-4-piperidinyl)ester(1,1-dimethylethylhydroperoxide) and octane (trade name "TINUVIN 123", manufactured by BASF), bis(1,2,2,6,6-pentamethyl-4-piperidyl)[[3,5-bis(1,1-dimethylethyl)-4-hydroxyphenyl]methyl]buthylmalonate (trade name "TINUVIN 144", manufactured by BASF), a reaction product of 2-aminoethanol with a reaction product of cyclohexane and N-buthyl-2,2,6,6-tetramethyl-4-piperidineamine-2,4,6-trichloro-1,3,5-triazine peroxide (trade name "TINUVIN 152", manufactured by BASF), a mixture of bis(1,2,2,6,6-pentamethyl-4-piperidyl) sebacate and methyl-1,2,2,6,6-pentamethyl-4-piperidyl sebacate (trade name "TINUVIN 292", manufactured by BASF).

The content of the light stabilizer (especially, the hindered amine-based light stabilizer) in the acrylic pressure-sensitive adhesive layer (especially, the acrylic pressure-sensitive adhesive layer of the present invention) (or in an acrylic pressure-sensitive adhesive composition) is not particularly limited, but is preferably, for example, from 0.1 to 3 parts by weight, more preferably from 0.1 to 1 parts by weight, based on 100 parts by weight of the acrylic polymer. The content of the light stabilizer of 0.1 part by weight or more is preferred since resistance against light is then easily exhibited. The content of the light stabilizer of 3 parts by weight or less is also preferred since coloring by the light stabilizer itself is then less likely to occur, thereby easily providing a pressure-sensitive adhesive layer having a high total light transmittance and a low haze.

(Crosslinking Agent)

The pressure-sensitive adhesive layer (especially, the acrylic pressure-sensitive adhesive layer of the present invention) may contain a crosslinking agent in terms of providing sufficient adhesive reliability to an adherend. For example, the acrylic polymer in the acrylic pressure-sensitive adhesive layer of the present invention may be crosslinked to control the gel fraction. The crosslinking agent may be used alone or in combination of two or more kinds thereof.

The crosslinking agent is not particularly limited, and examples thereof include an isocyanate-based crosslinking agent, an epoxy-based crosslinking agent, a melamine-based crosslinking agent, a peroxide-based crosslinking agent, an urea-based crosslinking agent, a metal alkoxide-based crosslinking agent, a metal chelate-based crosslinking agent, a metal salt-based crosslinking agent, a carbodiimide-based crosslinking agent, an oxazoline-based crosslinking agent, an aziridine-based crosslinking agent, an amine-based crosslinking agent and the like. Among them, the isocyanate-based crosslinking agent and the epoxy-based crosslinking agent are preferable, and the isocyanate-based crosslinking agent is more preferable.

As the isocyanate-based crosslinking agent (polyfunctional isocyanate compound), examples thereof include lower aliphatic polyisocyanates such as 1,2-ethylene diisocyanate, 1,4-butylenediisocyanate and 1,6-hexamethylene diisocyanate; alicyclic polyisocyanates such as cyclopentylene diisocyanate, cyclohexylene diisocyanate, isophorone diisocyanate, hydrogenated tolylene diisocyanate and hydrogenated xylene diisocyanate; and aromatic polyisocyanates such as 2,4-tolylene diisocyanate, 2,6-tolylene diisocyanate, 4,4'-diphenylmethane diisocyanate and xylylene diisocyanate. The isocyanate-based crosslinking agent may be, for example, commercially available products such as a trimethylolpropane/tolylene diisocyanate adduct (manufactured by Nippon Polyurethane Industry Co., Ltd., trade name "CORONATE L"), a trimethylolpropane/hexamethylene diisocyanate adduct (manufactured by Nippon Polyurethane Industry Co., Ltd., trade name "CORONATE HL"), a trimethylolpropane/xylylene diisocyanate adduct (manufactured by Mitsui Chemicals Co., Ltd., trade name "TAKENATE D-110N").

As the epoxy-based crosslinking agent (polyfunctional epoxy compound), examples thereof include N,N,N',N'-tetraglycidyl-m-xylenediamine, diglycidyl aniline, 1,3-bis(N, N-diglycidylaminomethyl)cyclohexane, 1,6-hexanediol diglycidyl ether, neopentyl glycol diglycidyl ether, ethylene glycol diglycidyl ether, propylene glycol diglycidyl ether, polyethylene glycol diglycidyl ether, polypropylene glycol diglycidyl ether, sorbitol polyglycidyl ether, glycerol polyglycidyl ether, pentaerythritol polyglycidyl ether, polyglycerol polyglycidyl ether, sorbitan polyglycidyl ether, trimethylolpropane polyglycidyl ether, adipic acid diglycidyl ester, o-phthalic diglycidyl ester, triglycidyl-tris(2-hydroxyethyl)isocyanurate, resorcin diglycidyl ether, bisphenol-S-diglycidyl ether and an epoxy-based resin having two or more epoxy groups in the molecule. The epoxy-based crosslinking agent may be, for example, commercially available products such as trade name "TETRAD C" manufactured by Mitsubishi Gas Chemical Company, Inc.

The content of the crosslinking agent in the pressure-sensitive adhesive layer (in particular, the acrylic pressure-sensitive adhesive layer of the present invention) is not particularly limited, and is preferably 0.001 parts by weight to 10 parts by weight, and more preferably 0.01 parts by weight to 5 parts by weight based on 100 parts by weight of the acrylic polymer.

(Silane Coupling Agent)

The pressure-sensitive adhesive layer (in particular, the acrylic pressure-sensitive adhesive layer of the present invention) may include a silane coupling agent for the purpose of improving an adhesion property to glass. The silane coupling agent may be used either alone or in combination of two or more thereof.

The silane coupling agent is not particularly limited, and examples thereof include γ-glycidoxypropyltrimethoxysilane, γ-glycidoxypropyltriethoxysilane, γ-aminopropyltrimethoxysilane and N-phenyl-aminopropyltrimethoxysilane are preferably exemplified. As the silane coupling agent, for example, a commercially available product such as trade name "KBM-403" (manufactured by Shin-Etsu Chemical Co., Ltd.) may be used. Among them, γ-glycidoxypropyltrimethoxysilane is preferable.

The content of the silane coupling agent in the pressure-sensitive adhesive layer (in particular, the acrylic pressure-sensitive adhesive layer of the present invention) (or in the acrylic pressure-sensitive adhesive composition) is preferably 0.01 parts by weight to 1 part by weight, and more preferably 0.03 parts by weight to 0.5 part by weight, based on 100 parts by weight of the acrylic polymer.

(Other Additive)

In the pressure-sensitive adhesive layer (in particular, the acrylic pressure-sensitive adhesive layer), if necessary, in addition to the ultraviolet absorber, light stabilizer, crosslinking agent and silane coupling agent, additives such as a crosslinking accelerator, a tackifying resin (rosin derivative, polyterpene resin, petroleum resin, and oil-soluble phenol), an antiaging agent, a filler, a colorant (dye or pigment), an antioxidant, a chain-transfer agent, a plasticizer, a softener, a surfactant and an antistatic agent may be used as long as the property of the present invention is not impaired.

The formation of the pressure-sensitive adhesive layer (in particular, the acrylic pressure-sensitive adhesive layer of the present invention) is not particularly limited, but the pressure-sensitive adhesive layer can be formed by applying the pressure-sensitive adhesive composition (in particular, the acrylic pressure-sensitive adhesive composition) on a substrate or a release liner, and if necessary, drying and/or curing the applied pressure-sensitive adhesive composition.

The acrylic pressure-sensitive adhesive composition may be produced, as needed, by further mixing an additive (for example, an ultraviolet absorber, a light stabilizer or the like) into the acrylic polymer or a solution containing the acrylic polymer.

In the coating of the pressure-sensitive adhesive composition, a known coating method can be used. For example, a coater such as a gravure roll coater, a reverse roll coater, a kiss roll coater, a dip roll coater, a bar coater, a knife coater, a spray coater, a comma coater and a direct coater, can be used.

The thickness of the pressure-sensitive adhesive layer (especially, the acrylic pressure-sensitive adhesive layer of the present invention) is not particularly limited, but is preferably from 10 to 200 μm, more preferably from 10 to 150 μm, and still more preferably from 10 to 100 μm, in terms of controlling the light transmittance and the haze and of providing adhesion reliability to a adherend.

A gel fraction (ratio of solvent insoluble matter) of the pressure-sensitive adhesive layer (in particular, the acrylic pressure-sensitive adhesive layer of the present invention) is not particularly limited, but is preferably 30 wt % to 95 wt % and more preferably 50 wt % to 95 wt % from the standpoint of the adhesion reliability to an adherend or flexibility of the pressure-sensitive adhesive layer.

The gel fraction can be measured as an insoluble matter in ethyl acetate, and in detail, as a weight fraction (unit: wt %) of an insoluble matter after the pressure-sensitive adhesive layer is immersed in ethyl acetate at 23° C. for 7 days, with respect to the sample before immersing.

Specifically, the gel fraction (solvent insoluble component) is, for example, a value calculated by "Method of measuring gel fraction" to be described below.

(Method of Measuring Gel Fraction)

About 0.1 g of the pressure-sensitive adhesive layer is sampled from the pressure-sensitive adhesive sheet, wrapped with a porous tetrafluoroethylene sheet (trade name "NTF1122", manufactured by Nitto Denko Corporation)

having an average pore size of 0.2 μm, and it is tied up with a kite string and at this time, it is measured for the weight, and the weight measured is designated as the weight before immersion. The weight before immersion is the total weight of the pressure-sensitive adhesive layer (pressure-sensitive adhesive layer sampled above), the tetrafluoroethylene sheet and the kite string. The total weight of the tetrafluoroethylene sheet and the kite string is also measured, and this weight is designated as the wrapper weight.

Subsequently, the pressure-sensitive adhesive layer of the present invention wrapped with a tetrafluoroethylene sheet and tied up with a kite string (hereinafter referred to as the "sample") is put in a 50 ml-volume vessel filled with ethyl acetate, followed by allowing to stand still at 23° C. for 7 days. The sample (after ethyl acetate treatment) is then taken out of the vessel, and it is transferred to an aluminum-made cup, followed by drying in a dryer at 130° C. for 2 hours to remove ethyl acetate, and it is measured for the weight, and this weight is designated as the weight after immersion.

The gel fraction is calculated according to the following formula:

$$\text{Gel fraction(wt \%)} = ((X-Y)/(Z-Y)) \times 100$$

(wherein X is the weight after immersion, Y is the wrapper weight, and Z is the weight before immersion).

The gel fraction of the acrylic pressure-sensitive adhesive layer can be controlled by, for example, a monomer composition and a weight average molecular weight of the acrylic polymer, a used amount (added amount) of the crosslinking agent, and the like.

Preferred specific embodiments for the pressure-sensitive adhesive layer of the present invention to have the characteristics of a total light transmittance not less than a predetermined value, a light transmittance at a wavelength of 380 nm not more than a predetermined value, and a haze not more than a predetermined value include an acrylic pressure-sensitive adhesive layer containing the above-mentioned acrylic polymer and the above-mentioned triazine-based ultraviolet absorber. This is because the acrylic polymer and the triazine-based ultraviolet absorber are highly compatible so that the acrylic pressure-sensitive adhesive layer having high transparency as well as exhibiting ultraviolet absorbency can easily be obtained. That is, the pressure-sensitive adhesive sheet of the present invention preferably includes an acrylic pressure-sensitive adhesive layer containing at least the acrylic polymer and the triazine-based ultraviolet absorber in terms of high ultraviolet absorbency and high transparency.

In particular, affinity of an acrylic polymer with a triazine-based ultraviolet absorber (especially, a hydroxyphenyl triazine ultraviolet absorber) tends to be enhanced when a monomer component having hydrophilicity such as the above-mentioned nitrogen atom-containing monomer and hydroxyl group-containing monomer is used as a monomer component forming the acrylic polymer. Preferred specific embodiments of the pressure-sensitive adhesive layer of the present invention include an acrylic pressure-sensitive adhesive layer that contains at least: an a acrylic polymer formed from a component including, as essential monomer components, an alkyl (meth)acrylate and/or an alkoxyalkyl (meth)acrylate, a monomer containing a nitrogen atom in the molecule and a monomer containing a hydroxyl group in the molecule; and a triazine-based ultraviolet absorber (especially, hydroxyphenyl triazine ultraviolet absorber), since compatibility of the acrylic polymer and the triazine-based ultraviolet absorber is enhanced, thereby more easily providing high ultraviolet absorbency and high transparency.

In the acrylic pressure-sensitive adhesive layer of the above particularly preferred specific embodiment, the acrylic polymer contained in the acrylic pressure-sensitive adhesive layer preferably contains, the alkyl (meth)acrylate and/or the alkoxyalkyl (meth)acrylate in a total of proportions thereof of from 30 to 99 wt % (preferably from 50 to 99 wt %, more preferably from 70 to 99 wt %), the nitrogen atom-containing monomer in a proportion of from 1 to 30 wt % (preferably from 3 to 25 wt %, more preferably from 3 to 20 wt %), and the hydroxyl group-containing monomer in a proportion of from 0.5 to 25 wt % (preferably from 1 to 20 wt %, more preferably from 5 to 20 wt %), based on the total monomer components (100 wt %) forming the acrylic polymer, in terms of compatibility with the triazine-based ultraviolet absorber (especially, hydroxyphenyl triazine ultraviolet absorber).

The pressure-sensitive adhesive layer of the present invention is not limited to the above specific embodiments.

As another embodiment, the present invention includes an embodiment of a pressure-sensitive adhesive sheet including at least a pressure-sensitive adhesive layer containing an acrylic polymer and a triazine-based ultraviolet absorber.

(II) Other Pressure-Sensitive Adhesive Layer

The pressure-sensitive adhesive sheet of the present invention may include a pressure-sensitive adhesive layer other than the pressure-sensitive adhesive layer of the present invention along with the pressure-sensitive adhesive layer of the present invention. The other pressure-sensitive adhesive layer includes, but not limited to, a known or common pressure-sensitive adhesive layer formed from a known pressure-sensitive adhesive such as an urethane-based pressure-sensitive adhesive, acrylic pressure-sensitive adhesive, rubber-based pressure-sensitive adhesive, silicone-based pressure-sensitive adhesive, polyester-based pressure-sensitive adhesive, polyamide-based pressure-sensitive adhesive, epoxy-based pressure-sensitive adhesive, vinylalkylether-based pressure-sensitive adhesive, and fluorine-based pressure-sensitive adhesive. The pressure-sensitive adhesive may be used alone or in combination of two or more kinds thereof.

(III) Substrate

The pressure-sensitive adhesive sheet of the present invention may also include a substrate. The substrate is not particularly limited, and examples thereof include various optical films such as a plastic film, an antireflection (AR) film, a polarizing plate and a retardation film. As materials of the plastic film and the like, examples thereof include plastic materials such as polyester resins such as polyethylene terephthalate (PET); acrylic resins such as polymethyl methacrylate (PMMA); polycarbonate; triacetyl cellulose (TAC); polysulfone; polyarylate; polyimide; polyvinyl chloride; polyvinyl acetate; polyethylene; polypropylene; ethylene-propylene copolymer; cyclic olefin-based polymer such as trade name "ARTON (cyclic olefin-based polymer; manufactured by JSR)" and trade name "ZEONOR (cyclic olefin-based polymer; manufactured by Nippon Zeon Co., Ltd.)". The plastic materials may be used either alone or in combination of two or more thereof. The "substrate" is a part laminated to an adherend together with the pressure-sensitive adhesive layer, when the pressure-sensitive adhesive sheet is laminated to the adherend (an optical member and the like). The separator (release liner) released in the use (lamination) of the pressure-sensitive adhesive sheet is not included in the "substrate".

The substrate is preferably a transparent substrate. The total light transmittance in a visible light wavelength region of the substrate (in accordance with JIS K7361-1) is not particularly limited, but is preferably 85% or more, and more preferably 88% or more. The haze of the substrate (in accordance with JIS K7136) is not particularly limited, but is preferably 1.5% or less, and more preferably 1.0% or less. The transparent substrate may be a PET film or a non-oriented film such as trade name "ARTON", and trade name "ZEONOR".

The thickness of the substrate is not particularly limited, but for example, is preferably 12 μm to 75 μm. The substrate may have a single layer shape or multilayer shape. On the surface of the substrate, for example, a known/general surface treatment such as a physical treatment such as a corona discharge treatment and a plasma treatment, and a chemical treatment such as an undercoat treatment, may be properly performed.

(IV) Pressure-Sensitive Adhesive Sheet of the Present Invention

As described above, the pressure-sensitive adhesive sheet of the present invention includes at least the pressure-sensitive adhesive layer. The pressure-sensitive adhesive sheet of the present invention may be a double-sided pressure-sensitive adhesive sheet in which both surfaces thereof are a pressure-sensitive adhesive surface, or may be a single-sided pressure-sensitive adhesive in which only one surface thereof is a pressure-sensitive adhesive surface. In addition, the pressure-sensitive adhesive sheet of the present invention may be a substrateless pressure-sensitive adhesive sheet or may be a pressure-sensitive adhesive sheet with sheet. Among them, the substrateless pressure-sensitive adhesive sheet is preferable, and the double-sided pressure-sensitive adhesive sheet consisting of the pressure-sensitive adhesive layer of the present invention is more preferable.

When the pressure-sensitive adhesive sheet of the present invention is a substrateless pressure-sensitive adhesive sheet, examples of the specific structure include, for example, a double-sided pressure-sensitive adhesive sheet consisting of a pressure-sensitive adhesive layer (especially, the pressure-sensitive adhesive layer of the present invention) and a double-sided pressure-sensitive adhesive sheet including the pressure-sensitive adhesive layer of the present invention and another pressure-sensitive adhesive layer. When the pressure-sensitive adhesive sheet of the present invention is a pressure-sensitive adhesive sheet with a substrate, examples of the specific structure include a single-sided pressure-sensitive adhesive sheet including the pressure-sensitive adhesive layer of the present invention on one side of the substrate, a double-sided pressure-sensitive adhesive sheet including the pressure-sensitive adhesive layers of the present invention on both sides of the substrate, and a double-sided pressure-sensitive adhesive sheet including the pressure-sensitive adhesive layer of the present invention on one side of the substrate and the other pressure-sensitive adhesive layer on the other side of the substrate.

On the pressure-sensitive adhesive surface of the pressure-sensitive adhesive sheet of the present invention, the separator (release liner) may be provided until it is used. In the case where the pressure-sensitive adhesive sheet of the present invention is a double-sided pressure-sensitive adhesive sheet, each pressure-sensitive adhesive surface may be protected by using separators, respectively, or protected in such a way that the surface is wound in a roll form by using one separator of which both sides are release surfaces. The separator is used as a protective material of the pressure-sensitive adhesive layer, and peeled when the pressure-sensitive adhesive layer is laminated to the adherend. In the case where the pressure-sensitive adhesive sheet of the present invention is a substrateless pressure-sensitive adhesive sheet, the separator functions as a support of the pressure-sensitive adhesive layer. The separator may not be provided.

As the separator, any known release paper may be used. The separator may be, but not particularly limited to, for example, a substrate having a release treated layer, a low adhesive substrate composed of a fluorine polymer, or a low adhesive substrate composed of a non-polar polymer. As the substrate having the release treated layer, examples thereof include a plastic film or paper whose surface is treated by a release agent such as silicon type, long-chain alkyl type, fluorine type, and molybdenum sulfide. As the fluorine-based polymer in the low adhesive substrate composed of fluorine polymer, examples thereof include polytetrafluoroethylene, polychlorotrifluoroethylene, polyvinyl fluoride, polyvinylidene fluoride, a tetrafluoroethylene-hexafluoropropylene copolymer and a chlorofluoroethylene-vinylidene fluoride copolymer. As the non-polar polymer, examples thereof include an olefine-based resin (for example, polyethylene, polypropylene and the like). The separator can be formed by using a known/general method. The thickness of the separator is not particularly limited.

The thickness (total thickness) of the pressure-sensitive adhesive sheet of the present invention is not particularly limited, but is preferably 100 μm to 200 μm, more preferably 10 μm to 150 μm, and more preferably 10 to 100 μm. The thickness of the separator is not included in the thickness of the pressure-sensitive adhesive sheet of the present invention.

The pressure-sensitive adhesive sheet of the present invention can be manufactured by a known and general manufacturing method of the pressure-sensitive adhesive sheet. In the case where the pressure-sensitive adhesive sheet of the present invention is a substrateless pressure-sensitive adhesive sheet, the pressure-sensitive adhesive sheet is obtained by forming the pressure-sensitive adhesive layer (in particular, the pressure-sensitive adhesive layer of the present invention) on the separator (release film) by the aforementioned method. In the case where the pressure-sensitive adhesive sheet of the present invention includes a substrate, the pressure-sensitive adhesive layer (in particular, the pressure-sensitive adhesive layer of the present invention) may be directly formed on the surface of the substrate (direct scan method), or may also be formed on the substrate by forming the pressure-sensitive adhesive layer (in particular, the pressure-sensitive adhesive layer of the present invention) on the separator and then transferring (laminating) the formed pressure-sensitive adhesive layer to the substrate (transfer method).

The pressure-sensitive adhesive sheet of the present invention has a total light transmittance not less than a predetermined value, a light transmittance at a wavelength of 380 nm not more than a predetermined value, and a haze not more than a predetermined value, and therefore is excellent in transparency and excellent in ultraviolet absorbency. Accordingly, the pressure-sensitive adhesive sheet of the present invention can realize a display device or input device that has an excellent ultraviolet protection property for a touch panel, a display element or the like therein, while retaining optical characteristics, even in the case of using a small amount of or no optical film. Examples of the display device include, for example, a liquid crystal display device, an organic EL (electroluminescence) display device, a PDP (plasma display panel), and electronic paper. Examples of the input device include a touch panel.

The pressure-sensitive adhesive sheet of the present invention, which has the characteristics described above, is preferably used for optical applications. That is, the pressure-sensitive adhesive sheet of the present invention is preferably an optical pressure-sensitive adhesive sheet, and more specifically, an optical pressure-sensitive adhesive sheet used in an application for laminating optical members each other (an optical member-laminating application) or an application for producing a product (optical product) in which the optical members are used.

Since the pressure-sensitive adhesive sheet of the present invention is excellent in ultraviolet absorbency, when a countermeasure against ultraviolet light is required in an optical product containing the pressure-sensitive adhesive sheet of the present invention, there is an advantage in that members other than the pressure-sensitive adhesive sheet of the present invention do not have to contain an ultraviolet absorber. Additionally, the pressure-sensitive adhesive sheet of the present invention is excellent in transparency, and therefore is less likely to adversely affect the appearance of the optical product containing the pressure-sensitive adhesive sheet of the present invention.

The addition of an ultraviolet absorber in members such as an optical film involves very high cost in the case of using a small amount of the film. The pressure-sensitive adhesive sheet of the present invention, however, has ultraviolet protection property imparted, thereby not requiring an ultraviolet absorber added to other optical members such as an optical film. Accordingly, by using the pressure-sensitive adhesive sheet of the present invention, it is possible to easily impart ultraviolet absorbing performance with a cost advantage.

The optical member refers to a member having an optical characteristic (for example, a polarized property, a photorefractive property, a light scattering property, a light reflective property, a light transmitting property, a light absorbing property, a light diffractive property, an optical rotation property and visibility). The optical member is not particularly limited so long as the optical member is a member having the optical characteristic, and a member constituting the device such as display device (image display device) and input device, or a member used in the device are exemplified, and examples thereof include a polarizing plate, a wave plate, a retardation plate, an optical compensation film, a brightness enhancing film, a light guide plate, a reflective film, an anti-reflective film, a transparent conductive film (e.g. ITO film), a design film, a decoration film, a surface protective film, a prism, lens, a color filter, a transparent substrate, and a member in which these are laminated (collectively referred to as "a functional film" in some cases). Each of the "plate" and the "film" include a plate shape, a film shape, and a sheet shape, and for example, the "polarizing film" includes a "polarizing plate" and a "polarizing sheet".

The optical member is not particularly limited, but for example, may be a member composed of glass, acrylic resin, polycarbonate, polyethyleneterephthalate, a metal thin film, or the like (for example, a sheet shape, film shape or plate shape of member). As described above, the "optical member" of the present invention also includes a member (a design film, a decoration film, a surface protective film or the like) for decoration or protection while maintaining visibility of the display device or the input device as an adherend.

EXAMPLES

The present invention will be described in detail below according to examples, but the invention is not limited to these examples.

Example 1

Into a separable flask, 63 parts by weight of 2-ethylhexyl acrylate (2EHA), 9 parts by weight of methyl methacrylate (MMA), 15 parts by weight of N-vinyl-2-pyrrolidone (NVP) and 13 parts by weight of 2-hydroxyethyl acrylate (HEA), as monomer components, and 175 parts by weight of ethyl acetate as a polymerization solvent were added and the mixture was stirred while introducing nitrogen gas for 1 hour. After thus removing oxygen within the polymerization system, 0.2 part by weight of 2,2'-azobisisobutyronitrile was added as a polymerization initiator, and the temperature was elevated to 63° C. to allow the system to react for 10 hours. Thereafter, ethyl acetate was added to provide a solution of acrylic polymer having solid concentration of 36 wt %.

The acrylic polymer in the above acrylic polymer solution had a weight average molecular weight of 850,000.

Next, to the above acrylic polymer solution, 0.528 part by weight of an isocyanate-based crosslinking agent (trade name "TAKENATE D110N", manufactured by Mitsui Chemicals Inc., active ingredient content: 75%), and 0.054 part by weight of a silane coupling agent (trade name "KBM403", manufactured by Shin-Etsu Chemical Co., Ltd., active ingredient content: 100%), 2.700 parts by weight of an ultraviolet absorber (trade name "TINUVIN 477", manufactured by BASF, active ingredient content: 80%, hydroxyphenyl triazine ultraviolet absorber), and 0.360 part by weight of a light stabilizer (trade name "TINUVIN 123", manufactured by BASF, active gradient content of 100%), relative to 100 parts by weight of the acrylic polymer were added and mixed to provide an acrylic pressure-sensitive adhesive composition.

The acrylic pressure-sensitive adhesive composition was then applied on a release-treated surface of a polyethylene terephthalate separator (PET separator) which had the release treated surface (trade name "MRF75", manufactured by Mitsubishi Plastics, Inc.) so that the thickness after drying became 50 μm, heated and dried at 60° C. for 1 minute and at 140° C. for 1 minute, further subjected to aging at 23° C. for 120 hours to provide a pressure-sensitive adhesive sheet (a substrateless pressure-sensitive adhesive sheet having a structure of acrylic pressure-sensitive adhesive layer/release film).

Comparative Example 1

An acrylic polymer solution was obtained in the same manner as in Example 1.

Next, to the acrylic polymer solution, 0.528 part by weight of an isocyanate-based crosslinking agent (trade name "TAKENATE D110N", manufactured by Mitsui Chemicals Inc., active ingredient content: 75%) and 0.054 part by weight of a silane coupling agent (trade name "KBM403", manufactured by Shin-Etsu Chemical Co., Ltd., active ingredient content: 100%), relative to 100 parts by weight of the acrylic polymer were added and mixed to provide an acrylic pressure-sensitive adhesive composition.

Using the pressure-sensitive adhesive composition, a pressure-sensitive adhesive sheet (a substrateless pressure-sensitive adhesive sheet having a pressure-sensitive adhesive layer on one side of a release film) was then obtained in the same manner as in Example 1.

(Measurements)

The following measurements were performed for the pressure-sensitive adhesive sheets obtained in Example and Comparative Example. The results are shown in Table 1.

(1) Haze

The pressure-sensitive adhesive layer surface of the pressure-sensitive adhesive sheet was laminated to a slide glass (trade name "MICRO SLIDE GLASS", model "S", manufactured by Matsunami Glass Ind., Ltd., thickness: 1.3 mm, total light transmittance: 91.8%, haze: 0.1%, ground edges), and was allowed to stand under an environment of a temperature of 23° C. and humidity of 50% RH for 30 minutes. After that, the release film was removed to provide a test piece.

The haze of the test piece was measured using a haze meter (trade name "HM-150", manufactured by Murakami Color Research Laboratory Co., Ltd.) in an environment of 23° C. and 50% RH.

The measurement of the haze was performed according to JIS K 7136.

(2) Total Light Transmittance (Light Transmittance at a Wavelength of 400 to 780 nm (Visible Light)) and Light Transmittance at a Wavelength of 380 nm The pressure-sensitive adhesive layer surface of the pressure-sensitive adhesive sheet was laminated to a slide glass (trade name "MICRO SLIDE GLASS", model "S", manufactured by Matsunami Glass Ind., Ltd., thickness: 1.3 mm, total light transmittance: 91.8%, haze: 0.1%, ground edges), and allowed to stand under an environment of a temperature of 23° C. and humidity of 50% RH for 30 minutes. After that, the release film was removed to provide a test piece.

The light transmittances at respective wavelengths of the test piece was measured using a haze meter (trade name "HM-150", manufactured by Murakami Color Research Laboratory) under an environment of 23° C. and 50% RH.

The measurement of the light transmittance was performed according to JIS K 7361-1.

(3) Adhesive Force (180° Peeling Adhesive Force)

The pressure-sensitive adhesive layer surface of the pressure-sensitive adhesive sheet was lined by laminating to a backing substrate and cut to a size of 20 mm in width and 100 mm in length to provide a test piece.

The release film was removed from the test piece, and the test piece was pressure-bonded to an adherend (a glass plate or a PET film) by moving a 2 kg roller back and forth once, and subjected to aging under atmosphere of 23° C. and 50% RH for 30 minutes.

After that, the adhesive force (180° peeling adhesive force) (N/20 mm) was measured according to JIS Z0237 (2000) by peeling the test piece from the adherend under a condition of a tensile speed of 300 mm/min and a peeling angle of 180 degree using a tensile tester (trade name "TG-1 kN), manufactured by Minebea Co., Ltd.) under atmosphere of 23° C. and 50% RH.

The glass plate used above was a soda-lime glass (manufactured by Matsunami Glass Ind., Ltd.) and the PET film used above was a PET film (trade name, "LUMIRROR-S-10#100", manufactured by Toray Industries, Inc.).

As the backing substrate, a PET film (trade name, "LUMIRROR-S-10#25", Method of measuring gel fraction Toray Industries, Inc.) was used when the adhesive force to a glass plate was to be measured, and a PET film (trade name, "A4100", manufactured by Toyobo Co, Ltd., a PET film surface-treated to attain easy adhesion, thickness: 125 μm) was used when the adhesive force to a PET film was to be measured.

(4) Gel Fraction

The gel fraction was determined by the method described above (Method of measuring gel fraction).

(5) b* Value (b* Value in L*a*b* Color System)

The pressure-sensitive adhesive layer surface of the pressure-sensitive adhesive sheet was laminated to a slide glass (trade name "MICRO SLIDE GLASS", model "S", manufactured by Matsunami Glass Ind., Ltd., thickness: 1.3 mm, total light transmittance: 91.8%, haze: 0.1%, ground edges), and was allowed to stand under an environment of a temperature of 23° C. and humidity of 50% RH. After that, the release film was removed to provide a test piece.

The b* value of the test piece was measured using a simplified spectrophotometric colorimeter (trade name "DOT-3C" manufactured by Murakami Color Research Laboratory Co., Ltd.).

The measurement of the b* value was performed according to JIS K 8729.

The b* value of 2.0 or less is less likely to adversely affect the appearance of the product in which the pressure-sensitive adhesive tape is used, and therefore is preferred.

TABLE 1

|  |  | Example 1 | Comparative Example 1 |
|---|---|---|---|
| Thickness [μm] |  | 50 | 50 |
| Haze [%] |  | 0.4 | 0.2 |
| Total light transmittance [%] |  | 92.1 | 92.4 |
| Light transmittance at a wavelength of 380 nm [%] |  | 0.01 | 91.7 |
| Adhesive force | To glass | 13.4 | 12.4 |
| [N/20 mm] | To PET | 9.9 | 10.6 |
| Gel fraction [wt %] |  | 84.9 | 90.7 |
| b* value |  | 1.23 | 0.23 |

Figure 1:
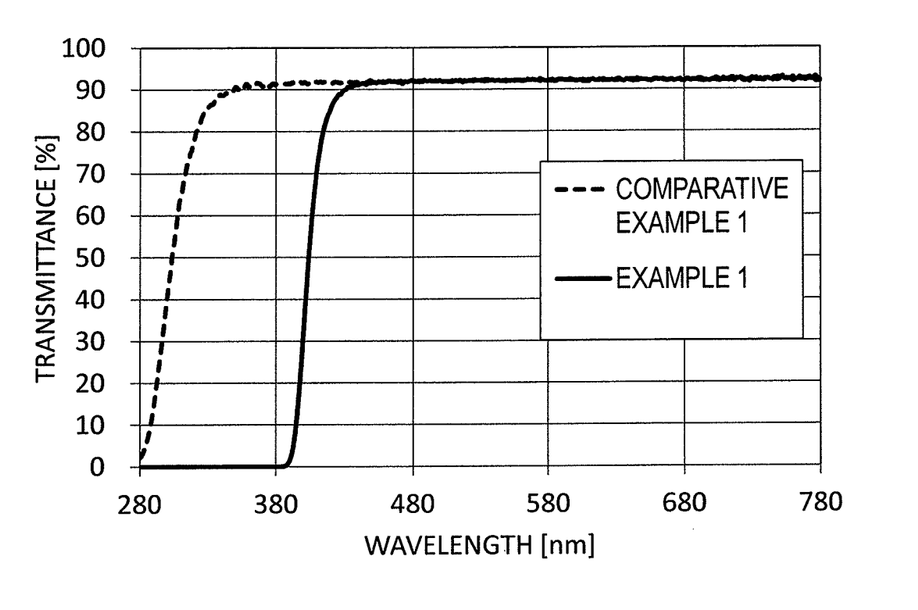
FIG. 1 is a graph showing light transmittance in a wavelength range of from 280 to 780 nm of pressure-sensitive adhesive sheets obtained in Example 1 and Comparative Example 1.

For the pressure-sensitive adhesive sheet obtained in Example 1 and Comparative Example 1, the light transmittances at respective wavelengths in the range of from 280 to 780 nm were determined in the same manner as in the aforementioned "(2) Total light transmittance (Light transmittance at a wavelength of 400 to 780 nm (visible light)) and light transmittance at a wavelength of 380 nm". The results thereof are shown in FIG. 1.

(Reference Test for Compatibility Between Acrylic Polymer and Ultraviolet Absorber)

An example of the reference experiment for compatibility of an acrylic polymer and an ultraviolet absorber is shown below.

Pretest for Compatibility

Monomer components (2-methoxyethyl acrylate (2MEA), 2-ethylhexyl acrylate (2EHA), 4-hydroxybutyl acrylate (4HBA), ethyl acrylate (EA), methyl methacrylate (MMA), N-vinyl-2-pyrrolidone (NVP), and/or 2-hydroxyethyl acrylate (HEA)) were selected so that the composition ratio of monomers shown in Table 2 below was attained, to provide a monomer mixture solution of 100 parts by weight of the monomer components in 200 parts by weight of ethyl acetate as a polymerization solvent.

The monomer mixture solution was added in a separable flask and stirred for 1 hour while introducing nitrogen gas. After thus removing oxygen within the polymerization system, 0.2 part by weight of 2,2'-azobisisobutyronitrile was added as a polymerization initiator, and the temperature was elevated to 63° C. to allow the system to react for 10 hours. Thereafter, ethyl acetate was added to provide a polymer solution having a solid concentration of 36 wt % (a polymer solution of the polymer A, a polymer solution of the polymer B, or a polymer solution of the polymer C).

Next, 4 parts by weight of an ultraviolet absorber was added to the polymer solution, which was stirred to determine the presence or the absence of cloudiness by visual observation.

When the cloudiness did not occur, the compatibility was rated as "good", and when the cloudiness occurred, the compatibility was rated as "poor".

The results are shown in Table 3.

TABLE 2

| Polymer | Monomer composition ratio (by weight) |
|---|---|
| Polymer A | 2MEA/2EHA/4HBA = 50/49/1 |
| Polymer B | 2MEA/EA/MMA/4HBA = 66/23/10/1 |
| Polymer C | 2EHA/MMA/NVP/HEA = 63/9/15/13 |

TABLE 3

| | Ultraviolet absorbency | | Solubility in Polymer | | |
|---|---|---|---|---|---|
| Ultraviolet absorber | Shorter wavelength | Longer wavelength | Polymer A | Polymer B | Polymer C |
| Tinuvin 326(benzotriazole UV absorber) | good | good | — | poor | good |
| Tinuvin 477(hydroxyphenyltriazine UV absorber) | good | good | poor | poor | good |
| Tinuvin 384-2(benzotriazole UV absorber) | good | poor | — | good | good |
| Tinuvin 479(hydroxyphenyltriazine UV absorber) | good | good | — | poor | good |
| Chimassorb 81(benzophenone UV absorber) | good | poor | — | good | good |
| Tinuvin 109(benzotriazole UV absorber) | good | poor | — | good | good |
| Sumisorb 130(benzophenone UV absorber) | good | poor | — | good | — |
| Sumisorb 300(benzotriazole UV absorber) | good | good | — | poor | — |
| Sumisorb 350(benzotriazole UV absorber) | good | poor | — | poor | — |
| Tinuvin 400(hydroxyphenyltriazine UV absorber) | good | poor | — | good | good |
| Tinuvin PS(benzotriazole UV absorber) | good | poor | — | good | good |
| Tinuvin 405(hydroxyphenyltriazine UV absorber) | good | poor | — | good | good |

In Table 3, the "shorter wavelength" means "light having a wavelength of 330 nm" and the "longer wavelength" means "light having a wavelength of 380 nm". The "good" in the columns of the ultraviolet absorbency shows a good light absorbency, and the "poor" shows a poor light absorbency.

The "-" in Table 3 shows that the evaluation was not performed.

The abbreviations in Table 3 means the followings.

Tinuvin 326: benzotriazole ultraviolet absorber (trade name "TINUVIN 326", manufactured by BASF)

Tinuvin 477: hydroxyphenyltriazine ultraviolet absorber (trade name "TINUVIN 477", manufactured by BASF)

Tinuvin 384-2: benzotriazole ultraviolet absorber (trade name "TINUVIN 384-2", manufactured by BASF)

Tinuvin 479: hydroxyphenyltriazine ultraviolet absorber (trade name "TINUVIN 479", manufactured by BASF)

Chimassorb 81: benzophenone ultraviolet absorber (trade name "CHIMASSORB 81", manufactured by BASF)

Tinuvin 109: benzotriazole ultraviolet absorber (trade name "TINUVIN 109", manufactured by BASF)

Sumisorb 130: benzophenone ultraviolet absorber (trade name "SUMISORB 130", manufactured by Sumitomo Chemical Company, Limited)

Sumisorb 300: benzotriazole ultraviolet absorber (trade name "SUMISORB 300", manufactured by Sumitomo Chemical Company, Limited)

Sumisorb 350: benzotriazole ultraviolet absorber (trade name "SUMISORB 350", manufactured by Sumitomo Chemical Company, Limited)

Tinuvin 400: hydroxyphenyltriazine ultraviolet absorber (trade name "TINUVIN 400", manufactured by BASF)

Tinuvin PS: benzotriazole ultraviolet absorber (trade name "TINUVIN PS", manufactured by BASF)

Tinuvin 405: hydroxyphenyltriazine ultraviolet absorber (trade name "TINUVIN 405", manufactured by BASF)

Example 1 above was performed using polymer C and a ultraviolet absorber (trade name "TINUVIN 477", hydroxyphenyl triazine ultraviolet absorber manufactured by BASF), which is a combination exhibiting a good compatibility between the acrylic polymer and the ultraviolet absorber.

As shown in Table 3, it can be readily presumed that, besides the combination of the acrylic polymer and the ultraviolet absorber used in Example 1, a certain combination of an acrylic polymer and an ultraviolet absorber, which shows a good solubility, exhibits the same effect as in Example 1. That is, those skilled in the art can practice the present invention even with a combination other than the specific combination described in Example 1 from the above results.

(Reference Test)

For pressure-sensitive adhesive sheets, the following light resistance test was performed to evaluate the light resistance thereof. Also, with respect to the light resistance, effects of a light stabilizer on the light resistance were shown. Upon the light resistance test, pressure-sensitive adhesive sheets of Examples 2 to 6 were further produced. The results of the test are shown in Table 4.

Example 2

A pressure-sensitive adhesive sheet (a substrateless pressure-sensitive adhesive sheet having a pressure-sensitive adhesive layer on one side of a release film) was obtained in the same manner as in Example 1, except that the acrylic pressure-sensitive adhesive composition was applied so that the thickness after drying became 12 μm.

Example 3

A pressure-sensitive adhesive sheet (a substrateless pressure-sensitive adhesive sheet having a pressure-sensitive adhesive layer on one side of a release film) was obtained in the same manner as in Example 2, except that the light stabilizer (trade name "TINUVIN 123", manufactured by BASF) was not added to the acrylic polymer solution.

Example 4

A pressure-sensitive adhesive sheet (a substrateless pressure-sensitive adhesive sheet having a pressure-sensitive adhesive layer on one side of a release film) was obtained in the same manner as in Example 2, except that an antioxidant (trade name "IRGANOX 1010", manufactured by BASF) was used instead of the light stabilizer (trade name "TINUVIN 123", manufactured by BASF).

Example 5

A pressure-sensitive adhesive sheet (a substrateless pressure-sensitive adhesive sheet having a pressure-sensitive adhesive layer on one side of a release film) was obtained in the same manner as in Example 2, except that the amount of the light stabilizer (trade name "TINUVIN 123", manufactured by BASF) was changed to 0.720 part by weight.

Example 6

A pressure-sensitive adhesive sheet (a substrateless pressure-sensitive adhesive sheet having a pressure-sensitive adhesive layer on one side of a release film) was obtained in the same manner as in Example 2, except that the amount of the light stabilizer (trade name "TINUVIN 123", manufactured by BASF) was changed to 1.080 parts by weight.

Light Resistance Test

The pressure-sensitive adhesive layer surface of the pressure-sensitive adhesive sheet was laminated to PET film (trade name "LUMIRROR S-10#25", manufactured by Toray Industries), was cut to a size of 20 mm in width and 100 mm in length and was allowed to stand under an environment of a temperature of 23° C. and humidity of 50% RH for 30 minutes to provide a laminate (a laminate of PET film/acrylic pressure-sensitive adhesive layer/release film).

The laminate was loaded on a sunshine carbon arc weatherometer (trade name "WEL-3 SUN-H", manufactured by Suga Test Instruments Co., Ltd.) and irradiated with light to start the test. The time point of starting the weathering test was set as the "initial time" of the weathering test.

Elongations (breaking elongations) were determined by the elongation test (breaking elongation test) described below at the "initial time", "200 hours after starting the test" (after 200 hours), "500 hours after starting the test (after 500 hours), and "1000 hours after starting the test" (after 1000 hours). The results are shown in Table 4.

Occurrence of deterioration of the PET film and degree thereof can be estimated from the elongations at those times, and weather resistance of the pressure-sensitive adhesive sheet was estimated from the occurrence of the film deterioration and the degree thereof. This estimation is based on the presumption that a good whether resistance causes a small deterioration of PET film, and a poor whether resistance causes a large deterioration of PET film.

Elongation Test (Breaking Elongation Test)

Elongations (breaking elongations) (%) were determined using a tensile tester (trade name "TG-1 kN", manufactured by Minebea Co., Ltd.) according to the tensile strength and elongation sections in JIS K 6767.

The test pieces upon conducting the elongation test have a laminate structure of PET film/pressure-sensitive adhesive layer, which is a structure obtained by excluding the release film from the above-mentioned laminate (the laminate of PET film/pressure-sensitive adhesive layer/release film).

TABLE 4

|  |  | Example | | | | |
|---|---|---|---|---|---|---|
|  |  | 2 | 3 | 4 | 5 | 6 |
| Breaking elongation [%] | Initial time | 150 | 150 | 150 | 150 | 150 |
|  | After 200 hr | 122 | 100 | 140 | — | — |
|  | After 500 hr | 97 | 5 | 14 | 75 | 82 |
|  | After 1,000 hr | 94 | 7 | 37 | — | — |

From the above results, it was able to be confirmed that the addition of a light stabilizer enhanced the weather resistance (the resistance against light).

While the invention has been described in detail and with reference to specific embodiments thereof, it will be apparent to one skilled in the art that various changes and modifications can be made therein without departing from the spirit and scope thereof.

This application is based on Japanese Patent Application No. 2011-216301 filed on Sep. 30, 2011, the entire subject matter of which is incorporated herein by reference.

The present invention provides the following pressure-sensitive adhesive sheet.

(1) A pressure-sensitive adhesive sheet, having:
a total light transmittance of 85% or more;
a light transmittance at a wavelength of 380 nm of 5% or less; and
a haze of 3% or less.

(2) The pressure-sensitive adhesive sheet according to (1), comprising a pressure-sensitive adhesive layer containing an acrylic polymer and a triazine-based ultraviolet absorber.

(3) The pressure-sensitive adhesive sheet according to (2), wherein the acrylic polymer contains, as a monomer unit, at least one of an alkyl (meth)acrylate having a linear or branched alkyl group and an alkoxyalkyl (meth)acrylate.

(4) The pressure-sensitive adhesive sheet according to (3), wherein a total of a proportion of the alkyl (meth)acrylate and a proportion of the alkoxyalkyl (meth)acrylate is 30 wt % or more based on total monomer components (100 wt %) forming the acrylic polymer.

(5) The pressure-sensitive adhesive sheet according to any one of (2) to (4), wherein the acrylic polymer contains, as a monomer unit, a monomer containing a nitrogen atom in a molecule thereof.

(6) The pressure-sensitive adhesive sheet according to (5), wherein a proportion of the monomer containing a nitrogen atom in a molecule thereof is 1 to 30 wt % based on total monomer components (100 wt %) forming the acrylic polymer.

(7) The pressure-sensitive adhesive sheet according to any one of (2) to (6), wherein the acrylic polymer contains, as a monomer unit, a monomer containing a hydroxyl group in a molecule thereof.

(8) The pressure-sensitive adhesive sheet according to (7), wherein a proportion of the monomer containing a hydroxyl group in a molecule thereof is 0.5 to 25 wt % based on total monomer components (100 wt %) forming the acrylic polymer.

(9) The pressure-sensitive adhesive sheet according to any one of (2) to (8), wherein a content of the triazine-based ultraviolet absorber is 1 to 10 parts by weight relative to 100 parts by weight of the acrylic polymer.

(10) The pressure-sensitive adhesive sheet according to any one of (1) to (9), which is an optical pressure-sensitive adhesive sheet.

The invention claimed is:

1. A pressure-sensitive adhesive sheet, having:
   a total light transmittance of 85% or more;
   a light transmittance at a wavelength of 380 nm of 5% or less; and
   a haze of 3% or less,
   wherein the pressure-sensitive adhesive sheet comprises a pressure-sensitive adhesive layer comprising a triazine-based ultraviolet absorber and an acrylic polymer containing, as monomer units, at least one of an alkyl (meth)acrylate having a linear or branched alkyl group and an alkoxyalkyl (meth)acrylate, a monomer containing a hydroxyl group in a molecule thereof, and a monomer containing a nitrogen atom in a molecule thereof,
   wherein a proportion of the monomer containing a nitrogen atom in a molecule thereof is 1 to 30 wt % based on total monomer components (100 wt %) forming the acrylic polymer, and
   wherein a content of the triazine-based ultraviolet absorber is 1 to 10 parts by weight relative to 100 parts by weight of the acrylic polymer.

2. The pressure-sensitive adhesive sheet according to claim 1, wherein a total of a proportion of the alkyl (meth)acrylate and a proportion of the alkoxyalkyl (meth)acrylate is 30 wt % or more based on total monomer components (100 wt %) forming the acrylic polymer.

3. The pressure-sensitive adhesive sheet according to claim 1, wherein a proportion of the monomer containing a hydroxyl group in a molecule thereof is 0.5 to 25 wt % based on total monomer components (100 wt %) forming the acrylic polymer.

4. The pressure-sensitive adhesive sheet according to claim 1, which is an optical pressure-sensitive adhesive sheet.

5. The pressure-sensitive adhesive sheet according to claim 1, wherein the triazine-based ultraviolet absorber is a hydroxyphenyl triazine-based ultraviolet absorber.

* * * * *